US010454943B2

(12) United States Patent
Moretti et al.

(10) Patent No.: US 10,454,943 B2
(45) Date of Patent: *Oct. 22, 2019

(54) AUGMENTED AND VIRTUAL REALITY BASED PROCESS OVERSIGHT

(71) Applicant: The Toronto-Dominion Bank, Toronto, Ontario (CA)

(72) Inventors: Christianne Moretti, Ontario (CA); James Zachary Pryor, Ontario (CA); Matthew Hamilton, Ontario (CA); Jonathan K. Barnett, Ontario (CA); Paul Mon-Wah Chan, Ontario (CA); Orin Del Vecchio, Ontario (CA); John Barbon, Ontario (CA); John Jong-Suk Lee, Ontario (CA)

(73) Assignee: The Toronto-Dominion Bank, Toronto (CA)

( * ) Notice: Subject to any disclaimer, the term of this patent is extended or adjusted under 35 U.S.C. 154(b) by 390 days.

This patent is subject to a terminal disclaimer.

(21) Appl. No.: 15/234,786

(22) Filed: Aug. 11, 2016

(65) Prior Publication Data

US 2017/0053245 A1 Feb. 23, 2017

Related U.S. Application Data

(60) Provisional application No. 62/206,024, filed on Aug. 17, 2015.

(51) Int. Cl.
*G06F 3/14* (2006.01)
*G06T 19/00* (2011.01)
(Continued)

(52) U.S. Cl.
CPC ............ *H04L 63/107* (2013.01); *G02B 27/01* (2013.01); *G06F 3/14* (2013.01); *G06Q 10/103* (2013.01); *G06T 19/006* (2013.01)

(58) Field of Classification Search
CPC combination set(s) only.
See application file for complete search history.

(56) References Cited

U.S. PATENT DOCUMENTS 6,621,505 B1 * 9/2003 Beauchamp ........... G06Q 10/10
715/700
7,415,509 B1 8/2008 Kaltenmark
(Continued)

FOREIGN PATENT DOCUMENTS

WO WO2012129282 A2 9/2012
WO WO2013085653 A1 6/2013

OTHER PUBLICATIONS

Retik et al., "Integrating Virtual Reality and Telepresence to Remotely Monitor Construction Sites: A ViRTUE Project," Artificial Intelligence in Structural Engineering, vol. 1454, Jun. 21, 2005, pp. 459-463.

*Primary Examiner* — Mark A Fleischer
(74) *Attorney, Agent, or Firm* — Fish & Richardson P.C.

(57) ABSTRACT

The present disclosure involves systems and computer implemented methods for generating a virtual or augmented reality-based oversight system of business processes at a location remote from where the business process is executed. In one example, system operations include identifying a process-based operation performed at a physical first location, where the operation is associated with a request for oversight from a remote second location. A current state of the operation at the first location is identified, and at least one input source at the first location is identified. A simulation of the current state of the operation at the first location incorporating input from the input source(s) is generated for presentation at the second location. An action performed at the first location in the current state of the (Continued)

operation is identified, and the second location is then transmitted a request to authorize the identified action.

20 Claims, 5 Drawing Sheets

(51) Int. Cl.
    *G02B 27/01*     (2006.01)
    *H04L 29/06*     (2006.01)
    *G06Q 10/10*     (2012.01)

(56) References Cited

U.S. PATENT DOCUMENTS

| | | | |
|---|---|---|---|
| 7,714,895 B2 | 5/2010 | Pretlove et al. | |
| 7,912,767 B1 | 3/2011 | Cheatham et al. | |
| 9,004,353 B1* | 4/2015 | Block | G06Q 20/1085 |
| | | | 235/379 |
| 9,208,485 B2* | 12/2015 | Kerner | G06Q 20/02 |
| 9,355,530 B1* | 5/2016 | Block | G07F 19/201 |
| 2004/0117065 A1 | 6/2004 | Wang | |
| 2005/0171811 A1* | 8/2005 | Campbell | G06Q 40/00 |
| | | | 705/35 |
| 2006/0017654 A1 | 1/2006 | Romo | |
| 2007/0106479 A1 | 5/2007 | Geerts et al. | |
| 2011/0271274 A1 | 11/2011 | Deng et al. | |
| 2012/0242695 A1 | 9/2012 | Martin | |
| 2013/0031202 A1 | 1/2013 | Mick et al. | |
| 2013/0050496 A1 | 2/2013 | Jeong | |
| 2013/0113871 A1 | 5/2013 | Ballantyne | |
| 2014/0006590 A1 | 1/2014 | Bittner et al. | |
| 2014/0047107 A1* | 2/2014 | Maturana | H04L 43/04 |
| | | | 709/224 |
| 2014/0184643 A1 | 7/2014 | Friend | |
| 2014/0244344 A1 | 8/2014 | Bilet et al. | |
| 2015/0248131 A1 | 9/2015 | Fairfield | |
| 2016/0038027 A1 | 2/2016 | Brozozowski et al. | |
| 2016/0055653 A1 | 2/2016 | Badawy et al. | |
| 2016/0277710 A1 | 9/2016 | Oyama | |
| 2016/0328866 A1 | 11/2016 | Neulander | |
| 2016/0339652 A1* | 11/2016 | Safai | B24B 49/12 |
| 2017/0054735 A1 | 2/2017 | Moretti et al. | |
| 2018/0076870 A1 | 3/2018 | Kim et al. | |
| 2018/0174311 A1 | 6/2018 | Kluckner et al. | |
| 2018/0189966 A1 | 7/2018 | Kamen et al. | |
| 2018/0214223 A1 | 8/2018 | Turener | |
| 2018/0324229 A1 | 11/2018 | Ross et al. | |

* cited by examiner

AUGMENTED AND VIRTUAL REALITY BASED PROCESS OVERSIGHT

CROSS-REFERENCE TO RELATED APPLICATIONS

This application claims the benefit of priority to U.S. Provisional Application Ser. No. 62/206,024, filed on Aug. 17, 2015, the contents of which are hereby incorporated by reference.

TECHNICAL FIELD

The present disclosure relates to computer systems and computer-implemented methods for generating a virtual or augmented reality-based oversight system of business processes at a location remote from where the business process is executed.

Many processes and procedures within various businesses and entities require multiple levels of authorizations to ensure accurate completion. For example, checks of a certain amount received at a teller may need to be authorized by a manager before acceptance, or a verification of a security analysis may require "four-eye" review. Further, many procedures require formal acknowledgement and recording of approval to confirm that such procedures were completed accurately to allow for complete records for audit review and to ensure security, compliance, and risk mitigation purposes.

SUMMARY

The present disclosure involves systems, software, and computer-implemented methods for generating a virtual or augmented reality-based oversight system of business processes at a location remote from where the business process is executed. In one example, the system operations include identifying a process-based operation performed at a physical first location, the process-based operation associated with a request for oversight from a remote second location. A current state of the process-based operation at the first location is identified, and at least one input source associated with the current state of the process-based operation at the first location is identified. A simulation of the current state of the process-based operation at the first location which incorporates input from the at least one identified input source is generated for presentation at a display of the second location. An action performed at the first location in the current state of the process-based operation is identified, where the action taken at the first location requires authorization by the second location. The second location is then transmitted a request to authorize the identified action. In some instances, the physical first location is associated with a first user and the remote second location is associated with a second user.

In one instance, the operations may further comprise, in response to receiving authorization from the second user at the second location, notifying the first user at the first location of the authorization and allowing the process-based operation to continue to a next state at the first location. Additionally, in response to not receiving authorization from the second user at the second location, execution of the process-based operation may be suspended at the first location. In some instances, suspending execution of the process-based operation at the first location may include providing control of the process-based operation to the second user at the second location, wherein the second user can perform or revise the identified action performed at the first location. Alternatively, suspending execution may include providing control of the process-based operation to the second user at the second location, receiving instructions from the second user related to at least one correction to the identified action, and providing control of the process-based operation to the first user at the first location to revise the identified action based on the received instructions.

In some instances, identifying the process-based operation may include identifying, from a plurality of process-based operations performed at a plurality of physical locations by at least the first user and a third user, a queue of two or more requests for oversight of at least two process-based operations performed by a plurality of second users remote from at least the first user and the third user, wherein the identified process-based operation is associated with the particular remote second user for oversight.

In some instances, identifying the at least one input source associated with the current state of the process-based operation at the first location of the first user may include identifying one of a video or image feed at the first location of the first user, a video or image feed associated with the first user, a video or image feed associated with the process-based actions of the first user, or a visualization of a display associated with the first user at the first location. Still further, identifying the at least one input source associated with the current state of the process-based operation at the first location includes a state indication associated with at least one connected device present at the first location or a state indication associated with at least one connected device involved in the process-based operation.

In some instances, the request for oversight from the remote second location may be manually requested by the first user, or the request may be automatically requested by a system at the first location with which the first user is performing the process-based operation. When the request is automatically requested, the first user may not be notified of the automatic request for oversight.

The operations may further include displaying the generated simulation of the current state of the process-based operation to the second user at the second location. In some instances, the generated simulation of the current state of the process-based operation can be displayed at the second location to the second user via an augmented reality display, wherein the augmented reality display comprises an overlay of at least a portion of input from the at least one input source on real-world content at the second location. That augmented reality display may also allow for input from the second user to authorize actions in the process-based operation. In other instances, the generated simulation of the current state of the process-based operation can be displayed at the second location to the second user via a virtual reality display, wherein the virtual reality display is presented within a virtual reality output device at the second location. That virtual reality display may allow for input from the second user to authorize actions in the process-based operation.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
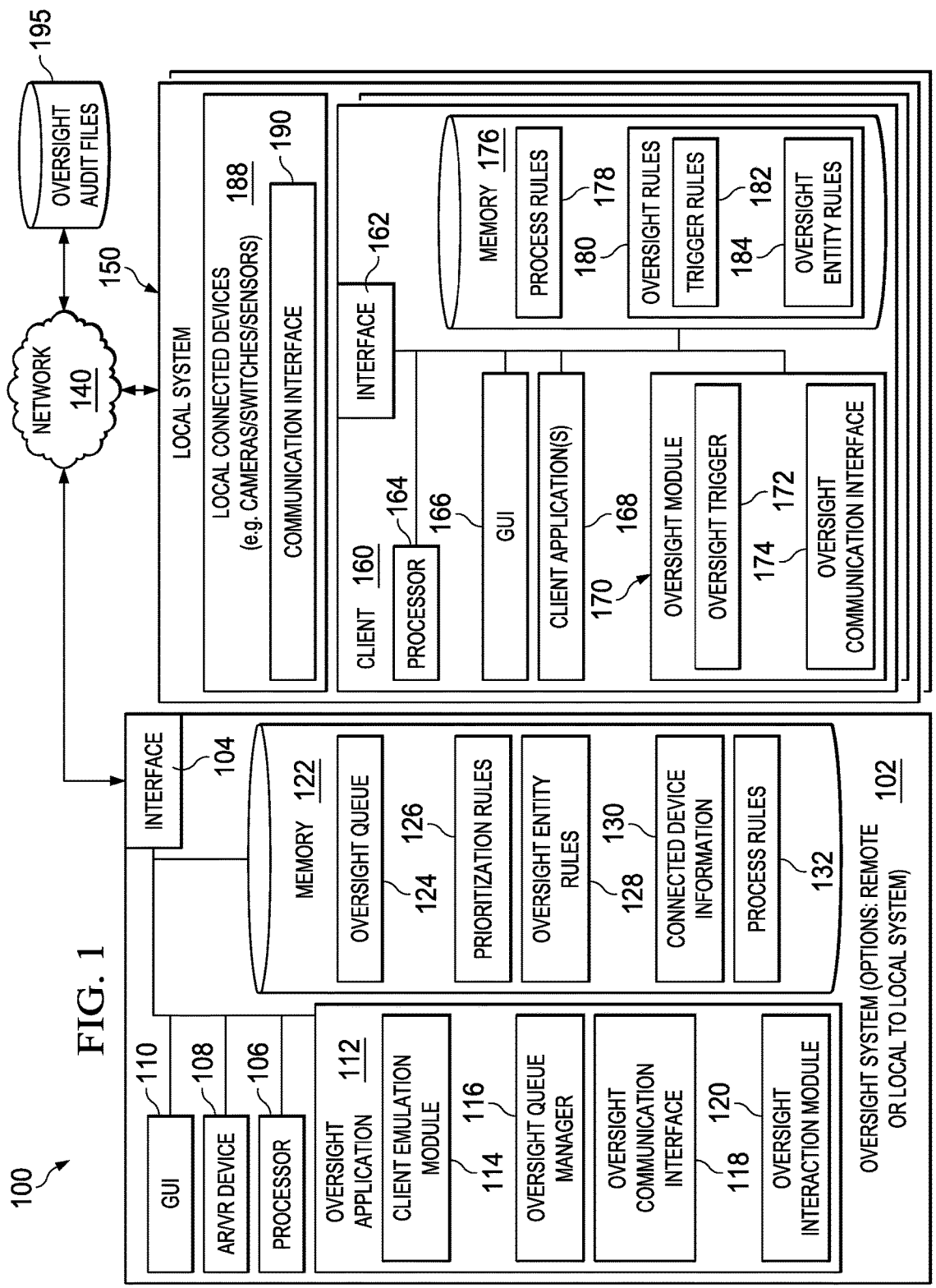
FIG. 1 is a block diagram illustrating an example system for implementing and performing a remote oversight process.

The present disclosure describes systems and methods for generating a virtual or augmented reality-based oversight system of business processes at a location remote from where the business process is executed. In the present disclosure, a process performed by a first user may be identified that requires remote oversight via a device. Oversight is requested and the request may be placed into an oversight queue, which may be at a centralized system or location. Using prioritization rules (with regard to the requests' priority) and assignment rules (with regard to the proper person to provide oversight), the request can be forwarded to a particular second user remote from the first user, where the second user has the authority to authorize, validate, or otherwise approve an action to be performed in the process of the first user.

In addition to sending the request for oversight to the second user, the described method and systems can use input sources located at and associated with the first user to generate a visual image or representation of the process and individual actions being performed by the first user at the first user's system or location. The visual image or representation can then be presented to the second user at the remote location, providing the second user with additional context in evaluating whether to authorize the action that initiated the request. In some instances, the visual image or representation can be presented to the second user via an augmented or virtual reality display, thereby allowing the second user to be provided with an immersive understanding, view, and interpretation of the events occurring at the first user's location. Further, during the oversight process, the actions performed by both the first user and the remote second user can be recorded and maintained for audit and compliance usage, including the items presented to and authorized by the second user.

Among other advantages understandable from the description, these methods and systems can provide enhanced security to operations requiring a second set of eyes or managerial approval while also increasing the level of convenience in obtaining the oversight. For example, no longer do local users need to have a second local, but potentially inconveniently located, user provide the authorization. Instead, a virtual or augmented reality-based system can capture current visual images and videos that can be used for real-time or near-real-time observation and authorization from second users remote from the first user. In some instances, the second user may be in the same building as the first user, but not immediately local (e.g., within several steps) to the first user. By providing the second user with the appropriate context information of the first user's current state and the corresponding images or videos associated with that state, reviews of the process and actions within that process can be performed by the users apart or remote from the first user in a manner similar to if they were physically near the user. Further, by providing a detailed audit log including, among other content and context, the information and data provided to the second user, the authorizations provided, and the results of the process, confident and effective audit procedures can be performed for later review of the oversight process. Still further, by providing the second set of eyes to perform various authorizations, fraud can be significantly reduced by using remote—and potentially more objective—second users to review and authorize actions. Additionally the methods and systems described here can increase operational efficiency through time saved related to flagging down local, but inconveniently located, second users and, in response to allowing remote users authorize actions, reduce the number of full-time equivalent employees needed at a particular location. Further, the time needed to obtain an authorization may be reduced, thereby enhancing customer experiences. The system and methods may also be used as tools for feedback, training, and coaching users through various processes, as well as through the use of the recorded interactions.

The system and methods described herein may be used in various implementations and businesses. For example, bank activities and customer service may be particularly beneficial implementations of the system. In a bank example, the solution described in this application may be used to assist in the oversight of bank branch opening and closing processes, approval of deposits and/or withdrawals over certain amounts, review of potentially fraudulent activity, verifications of transactions between employees and customers (e.g., counting cash withdrawal amounts), locating customer account information, and confirming timing of and/or availability to accessing a bank vault. In general, any situation requiring a superior's approval may benefit from the solutions. In brick-and-mortar stores, for instance, both checkout and return processes may implement variations on the current solution, as well as store opening and closing processes, among others.

In some implementations, the system and methods for oversight may be used where the first user is unaware of the oversight process. Such instances may be used in banking situations triggering anti-money laundering (AML) procedures, such as where the amounts of money or valuables being transacted exceed federal or state limits and require further review and/or analysis. In those instances, the remote second user may not be in a direct chain of authority of the first user (i.e., not a direct supervisor or supervisory role to the first user), but rather a separate team of employees or agents dedicated to instances where such statutes or determinations are made.

Turning to the illustrated implementation, FIG. 1 is a block diagram illustrating an example system 100 for implementing and performing a remote oversight process. As illustrated in FIG. 1, system 100 is a client-server and device-client system capable of sharing and communicating information across a set of devices at a local system 150 to an oversight system 102 via network 140. Further, both the local system 150 and the oversight system 102 can store operational information and interactive actions in the oversight audit files 195. In some instances, the oversight system 102 may represent a queuing and assignment system, where different oversight requests are then forwarded to one or more clients separate from the oversight system 102. In the present illustration, one or more oversight users may interact with the oversight system 102 to perform their respective oversight processes. Although components are shown individually, in some implementations, functionality of two or more components, systems, or servers may be provided by a single component, system, or server.

As used in the present disclosure, the term "computer" is intended to encompass any suitable processing device. For example, both client 160 and the oversight system 102 may be any computer or processing device such as, for example, a blade server, general-purpose personal computer (PC), Mac®, workstation, UNIX-based workstation, or any other suitable device. Moreover, although FIG. 1 illustrates an oversight system 102, oversight system 102 can be implemented using two or more systems, as well as computers other than servers, including a server pool. In other words, the present disclosure contemplates computers other than general purpose computers, as well as computers without conventional operating systems. Similarly, the AR/VR device 108 illustrated within the oversight system 102 may be its own computing device and can receive instructions and/or content from the oversight system 102 while being considered its own computer. On the other side of the illustration, the client 160 may be any suitable type of device including a smartphone, tablet, laptop computer, or any other suitable device. The local connected devices 188 may be directly associated with, embedded within, and/or integral to the client 160, or they may be separate therefrom. In general, these illustrated components may each be adapted to execute any operating system, including Linux, UNIX, Windows, Mac OS®, Java™, Android™, or iOS. According to one implementation, the illustrated systems may also include or be communicably coupled with a communication server, an e-mail server, a web server, a caching server, a streaming data server, and/or other suitable server or computer.

In general, the oversight system 102 is used to receive, manage, and interact with various oversight requests generated by one or more clients 160 from a local system 150. The oversight system 102 can be physically local to or remote from the local system 150. In general, the oversight system 102 receives oversight requests from the client system 160 related to one or more process-based operations with defined steps and instructions. When those operations are being executed at the client 160, requests for oversight may be generated that are then received by the oversight system 102. Using advanced analysis and queuing techniques, the oversight system 102 can assign or associate received requests to particular oversight users. As noted, the oversight users may interact with the oversight system 102 directly or through interactive communications with the oversight system 102 (e.g., via a virtual private network (VPN), web portal, or other suitable connection). In facilitating the oversight, the oversight system 102 can identify or receive information identifying the process-based operation being performed, the current state of the process, and information identifying one or more input sources from which image and video data associated with the execution of the process can be received. The oversight system 102 can combine this information to identify the oversight user and provide a virtual representation of that set of information to the oversight user, in some instances using a virtual reality (VR) or augmented reality (AR) display. The oversight user can then watch and/or monitor and authorize and/or oversee certain actions taken by the user at the client 160 while remaining remote from the client's 160 location. Oversight of the operations may be for a single step of the operation (e.g., approving a deposit amount) or for the entire operation (e.g., for opening or closing a branch of a bank). As steps are performed, the oversight user can interact with the client-side user (also referred to as the "requesting user") to approve, authorize, or monitor the actions taken. In some instances, the oversight user may be able to take control of or remotely access the capabilities of the client 160 to revise, change, or otherwise modify the actions of the client-side user.

The oversight system 102 may be dedicated to oversight operations, or the system 102 may be used for a plurality of operations and functionality. Additionally, as described above, oversight users may use the oversight system 102 directly (e.g., at the location of the oversight system 102) or may connect to the oversight system 102 remotely, such as at one or more oversight user devices (not shown). The oversight system 102 as illustrated in FIG. 1 contemplates a single device, although the oversight system 102 may be any suitable system and/or device type, including a cloud-based system executing remote from the oversight users. Additionally, while all of the functionality of the oversight system 102 is illustrated within the oversight system 102, one or more operations associated with the oversight process may be performed remote from the oversight system 102.

As illustrated, the oversight system 102 includes an interface 104, a processor 106, an augmented reality (AR) and/or virtual reality (VR) device 108 (referred to generally as "AR/VR device"), graphical user interface 110, oversight application 112, and memory 122. The oversight system 102 may connect directly or indirectly to one or more local systems 150 via a wireless or wired technology (e.g., via network 140, Bluetooth, Near-Field Communications (NFC), etc.), or the oversight device 102 may contact one or more application programming interfaces (APIs) associated with one or more of the components within particular local systems 150. Where the oversight system 102 is associated with one or more oversight users, the oversight system 102 can provide access to the oversight functionality and communications via one or more connections of any suitable type.

The interface 104 is used by the oversight system 102 for communicating with other systems in a distributed environment—including within the environment 100—connected to the network 140, e.g., local systems 150 as a whole, individual clients 160, local connected devices 188, and other oversight users, as well as other systems communicably coupled to the network 140. Generally, the interface 104 comprises logic encoded in software and/or hardware in a suitable combination and operable to communicate with the network 140. More specifically, the interface 104 may comprise software supporting one or more communication protocols associated with communications such that the network 140 or interface's hardware is operable to communicate physical signals within and outside of the illustrated environment 100. Still further, the interface 104 may allow the oversight system 102 to create ad hoc or dedicated connections to one or more of the clients 160 or local connected devices 188.

Network 140 facilitates wireless or wireline communications between the components of the environment 100 (e.g., between the clients 160 and the oversight system 102, as well as between the oversight system 102 or client 160 and the oversight audit files 195), as well as with any other local or remote computer, such as additional clients, servers, or other devices communicably coupled to network 140, including those not illustrated in FIG. 1. In the illustrated environment, the network 140 is depicted as a single network, but may be comprised of more than one network without departing from the scope of this disclosure, so long as at least a portion of the network 140 may facilitate communications between senders and recipients. In some instances, one or more of the illustrated components (e.g., the oversight system 102 itself) may be included within network 140 as one or more cloud-based services or operations. The network 140 may be all or a portion of an enterprise or secured network, while in another instance, at least a portion of the network 140 may represent a connection to the Internet. In some instances, a portion of the network 140 may be a virtual private network (VPN). Further, all or a portion of the network 140 can comprise either a wireline or wireless link. Example wireless links may include 802.11a/b/g/n, 802.20, WiMax, LTE, and/or any other appropriate wireless link. In other words, the network 140 encompasses any internal or external network, networks, sub-network, or combination thereof operable to facilitate communications between various computing components inside and outside the illustrated environment 100. The network 140 may communicate, for example, Internet Protocol (IP) packets, Frame Relay frames, Asynchronous Transfer Mode (ATM) cells, voice, video, data, and other suitable information between network addresses. The network 140 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, the oversight system 102 includes a processor 106. Although illustrated as a single processor 106 in FIG. 1, two or more processors may be used according to particular needs, desires, or particular implementations of the environment 100. Each processor 106 may be a central processing unit (CPU), an application specific integrated circuit (ASIC), a field-programmable gate array (FPGA), or another suitable component. Generally, the processor 106 executes instructions and manipulates data to perform the operations of the oversight device 102. Specifically, the processor 106 executes the algorithms and operations described in the illustrated figures, including the operations performing the functionality associated with the oversight device 102 generally, as well as the various software modules (e.g., the oversight application 112), including the functionality for sending communications to and receiving transmissions from the local systems 150 (e.g., the clients 160 and local connected devices 188), the oversight audit files 195, and the oversight users.

The illustrated oversight system 102 also includes memory 122, or multiple memories 122. The memory 122 may include any memory or database module and may take the form of volatile or non-volatile memory including, without limitation, magnetic media, optical media, random access memory (RAM), read-only memory (ROM), removable media, or any other suitable local or remote memory component. The memory 122 may store various objects or data, including financial data, user information, administrative settings, password information, caches, applications, backup data, repositories storing business and/or dynamic information, and any other appropriate information including any parameters, variables, algorithms, instructions, rules, constraints, or references thereto associated with the purposes of the oversight system 102. Additionally, the memory 122 may store any other appropriate data, such as VPN applications, firmware logs and policies, firewall policies, a security or access log, print or other reporting files, as well as others. For example, memory 122 can store the oversight queue 124, prioritization rules 126, oversight entity rules 128, connected device information 130, and process rules 132.

The oversight queue 124 can include any suitable queue or queuing mechanism storing a list or database of current oversight requests received from various local systems 150 or clients 160. Information identifying the requesting user and/or the requesting system can be stored in the queue 124 of requests. The oversight queue 124 is created and managed by the oversight queue manager 116, illustrated as part of the oversight application 112.

The prioritization rules 126 are a set of rules defining how incoming requests are to be prioritized among other incoming or already received requests. For example, the prioritization rules 126 may include rules indicating how requests from different individuals, different applications, and persons of different roles are prioritized within the queue 124. The oversight queue manager 116 may access these prioritization rules 126 to determine where and how to slot requests.

The oversight entity rules 128 are a set of rules used to identify particular oversight users to associate with oversight requests. In some instances, the oversight entity rules 128 may provide requests to a direct or indirect superior of the requesting user, such as the user's manager. In other instances, the type of oversight request may be directed to a different group or user, such as when actions relate to a potential fraud issue and review. The oversight rules 128 may include rules that direct oversight requests to an oversight user relatively local to the requesting user, while in others, the rules may direct the oversight request to a centralized or third-party location. Any suitable set of rules can be created, edited, and otherwise managed by users of appropriate authorization. In some instances, the oversight request may include a request for a specific oversight user—the oversight rules 128 can be used to determine if the requested oversight user is authorized to perform the oversight. Still further, the oversight entity rules 128 may identify multiple potential or acceptable oversight users, where the actual assignment is based at least in part on the relative availability of the multiple oversight users. The oversight entity rules 128 can be used by the oversight queue manager 116 to manage assignment of oversight requests.

The connected device information 130 stores information from one or more local connected devices 188 at the location of the requesting user or associated with the oversight request. The connected device information 130 can be available before request is received, included in the request itself, or determined by the oversight application 112 in response to a received request. The connected device information 130 can store information on which local connected devices 188 may be used to provide a view of the process from the perspective of or related to the user associated with the request. The connected device information 130 may include information on how to connect to the device, where the device is located, available feeds or sources associated with the device, as well as other information allowing the oversight system 102 to connect to and use inputs from the connected device(s) to present an augmented or virtual reality presentation to the oversight user. The connected device information 130 may also include information identifying the requesting device and its functionality. In some instances, the inputs from the connected devices may be, in addition to captured imaging, video, or audio from a device, a state indication of a particular connected device. In some instances, the state indication may be the output of a connected device (e.g., the result of the device's operation), state-based information of the device (e.g., whether the device is in an on or off position, or whether the device is locked or unlocked), environmental information of or determined by the device (e.g., temperature, humidity, etc.), or system information (e.g., whether visual information is available, whether a subject or object is present, etc.). The state indications can be presented in a chart, illustration, text, or other display to the oversight user during the oversight process.

Process rules 132 define the operations and requirements of various processes being provided oversight. In some instances, at least some of the process rules 132 can store information on the various processes associated with oversight such that the process rules 132 are available at any time. In other instances, at least some of the process rules 132 may be downloaded or otherwise accessed at the time they are requested. In those instances, the oversight application 112 may access process rules 178 stored at the corresponding client 160 being monitored and associated with the oversight request, or the rules may be downloaded from a central repository based on a process identification associated with the received request. In some instances, process rules 132 may include operations and requirements from the perspective of the oversight user while process rules 178 include operations and requirements from the perspective of the client-side or requesting user. Further, process rules 132 may include the operations and requirements from both the oversight user's perspective and the requesting user's perspective, while the process rules 178 only provide them from the requesting user's perspective.

The AR/VR device 108 may be any suitable device capable of presenting an augmented or virtual reality presentation to a user. Augmented reality devices blend a view of a virtual presentation with a real-life or live presentation of information. One example of such augmented reality device is Google Glass and other wearable technology using an optical head-mounted display. With augmented reality, users are able to interact with virtual contents in the real word and can, in most cases, distinguish between real and virtual contents. Another example of augmented reality can be realized in smart devices, such as a smartphone or tablet with a camera. While presenting images on the screen captured by the camera of the device, augmented reality devices or functionality may present additional virtual elements within the otherwise real-world display, enhancing or modifying the images shown on the display. Virtual reality devices traditionally isolate the user from the real world, presenting a visual display that is completely computer generated. Virtual reality devices include virtual reality helmets or goggles, such as the Oculus Rift. The particular AR/VR device 108 used in particular implementations may vary based on the business or activities for which it may be used. In some instances, the AR/VR device 108 may be capable of providing both an augmented or virtual reality presentation in different modes.

The GUI 110 of the oversight system 102 interfaces with at least a portion of the environment 100 for any suitable purpose, including generating a visual representation of a Web browser and/or the oversight application 112. In particular, the GUI 110 may be used to view and navigate various Web pages located both internally and externally to environment 100, as well as to view and navigate through information accessed by the oversight application 112, such as information stored at or associated with one or both of the oversight system 102 or the client 160, among others. Generally, the GUI 110 provides the oversight user with an efficient and user-friendly presentation of data provided by or communicated within the system. The GUI 110 may comprise a plurality of customizable frames or views having interactive fields, pull-down lists, and buttons operated by the user. For example, the GUI 110 may provide interactive elements that allow a user to view or interact with information related to the operations of the process associated with the oversight process. The GUI 110, for example, may be where the oversight user is able to provide feedback (e.g., authorization) or otherwise modify actions taken by the client-side user associated with the oversight request. Alternatively or in addition, the AR/VR device 108 and its components or other components may allow oversight users to communicate with the requesting user, such as through voice commands or interactions. The GUI 110 may present information associated with the client application 168 for viewing and interaction at the oversight device 102. In general, the GUI 110 is often configurable, supports a combination of tables and graphs (bar, line, pie, status dials, etc.), and is able to build real-time portals and presentations, where tabs are delineated by key characteristics (e.g., site or micro-site). Therefore, the GUI 110 contemplates any suitable graphical user interface, such as a combination of a generic web browser, intelligent engine, and command line interface (CLI) that processes information in the platform and efficiently presents the results to the user visually.

In some instances, either the AR/VR device 108 and/or the GUI 110 may present connected device-related information to the oversight user. For example, doors, keypads, and other components associated with the requesting user's location may be connected such that information related to their current status may be available. That status can then be presented, as appropriate, to the oversight user for visual, textual, or auditory notification. In a branch opening or closing example, the fact that a connected door is left open may be presented to the oversight user, thereby allowing the system to incorporate not only information from the requesting user into the oversight process but also other information made possible by the connected devices associated with the process being overseen.

As noted, the oversight system 102 includes the oversight application 112. The oversight application 112 represents an application, set of applications, software, software modules, or combination of software and hardware used to manage the oversight process and the management of the queue of requests for oversight. In the illustrated solution, as described above, the oversight system 102 is shown as a single system. In many implementations, the oversight system 102 may be a set of related, remote, or individual components used to perform the described functionality of the single oversight system 102. Specifically, one or more oversight users may be remote to the oversight system 102. In response to the oversight system 102 identifying a particular oversight user for assignment to a particular request for oversight, the oversight system 102 may send the request to a system associated with the assigned oversight user such that the oversight operations are performed at the system of the assigned oversight user, not at the oversight system 102 itself. Alternately, oversight users may interact directly with the oversight system 102, or through a web-based portal or other connection, and perform the oversight operations at or via the oversight system 102 itself.

In general, the oversight system 102 identifies requests for oversight received from one or more clients 160. The identified requests may include information on the user associated with the request, the application associated with the request, and/or the location associated with the request.

The oversight system 102 includes the oversight queue manager 116 to manage, prioritize, and assign the received request. The oversight queue manager 116 can automatically—without user intervention—apply the prioritization rules 126 and the oversight entity rules 128 to determine the order in which the received or identified requests are handled as well as to which oversight users the requests should be assigned.

The oversight communication interface 118 is used by the oversight application 112 to communicate with the client 160, the local connected devices 188 associated with the particular client 160 and relevant to the received request, and any assigned oversight user. In particular, the oversight communication interface 118 can obtain and/or access information relevant to the current state or status of a process-based operation being performed at the client 160 and requesting oversight. As the process-based operations include a set of process rules 132, 178 defining the operations and requirements to be performed, the current state may include an identification of the location or step in the process at which the requesting user is at, as well as the information needed for the oversight user to perform his or her oversight duties. In addition to the current state, one or more local connected devices 188 may also be identified. The oversight communication interface 118 can interface with those devices 188, allowing images and video from those devices 188 to be provided to and/or integrated into a presentation to the oversight user, thereby providing them with the sense of location and input and output as the requesting user may be experiencing. The oversight communication interface 118 also provides the oversight application 112 an interface to the oversight audit files 195, ensuring that a recording of any relevant actions taken by the oversight user and/or the requesting user are available for future audits, compliance, review, and/or training.

Using information accessed by the oversight communication interface 118, the oversight application 112 includes a client emulation module 114 that can generate, in some cases in connection with the AR/VR device 108, a screen or display that can emulate either the requesting user's screen or a visualization of the environment of the requesting user. In some instances, the emulation may be of a portion of the requesting user's environment, while other portions of the display at the oversight user's system include information on the operations to be performed as well as other information relevant to the oversight. The client emulation module 114 may be optimized to generate one or both of an augmented reality-based display and/or a virtual reality-based display of at least a portion of the requesting user's environment. In some instances, the emulation may be exactly the same display or view of the requesting user, while in other instances, the client emulation module 114 may generalize, modify, or otherwise change the display presented to the oversight user, such as for convenience, optimization, or other factors.

The oversight interaction module 120 of the oversight application 112 provides functionality related communication and interaction between the oversight user and the requesting user. The oversight interaction module 120 provides the oversight user with the ability to approve, reject, or otherwise oversee the operations performed by the requesting user. The interaction module 120 can provide additional imagery and feedback to the oversight user during the oversight process. For example, the interaction module 120 may provide or generate an interrupt object, button, or other input for the oversight user to use during the oversight process. In response to the requesting user performing an action incorrectly within the process, the oversight user may be able to interrupt and/or correct the action using the oversight interaction module 120. Other inputs to allow for the oversight user to interact with the oversight review may include a PIN or password entry at the oversight user's system, a fingerprint entry, or other suitable interface elements.

In some instances, the oversight interaction module 120 in connection with the oversight communication interface 118 can allow the oversight user to continue a running or intermediate discussion with the requesting user, including providing assistance and walkthroughs of the process as the requesting user continues working through the process.

In some instances, the requesting user may not be notified that an oversight process has been initiated. As noted, these instances may include AML-related issues in a banking implementation, as well as in other suitable instances. For example, AML situations may occur where potential collusion between the requesting user and a customer or other party may raise flags—by not notifying the requesting user of the oversight process, potentially criminal or otherwise illegal actions can be monitored. In those instances, the oversight interaction module 120 may include interrupt buttons or available interactions, approvals, or other suitable interactions. In some of those instances, the action taken by the oversight user may not be relayed to the requesting user, but instead logged in the audit log. Where an issue arises during the oversight review, persons or entities other than the requesting user may be notified, such as security, government agencies, or other suitable entities.

The oversight interaction module 120 may allow the authorization to occur directly in the AR/VR device 108, or through a separate input such as the presentation on the GUI 110. Additionally, voice commands and general communications may be received through either the device 108 or the oversight user's system. Additionally, the oversight interaction module 120 and the other components of the oversight system 102 may include functionality for triggering additional monitoring or emergency situations. For example, sensors, motion-sensitive cameras, cloud-connected cameras, user-initiated devices or inputs, and other devices may capture or determine that an emergency situation has arisen. In those instances, further actions or notifications to persons and services other than the oversight user may be issued, either automatically or as suggested actions requiring oversight user confirmation before occurring.

In some systems, the oversight system 102 may allow for the oversight user to communicate directly with the client 160 to perform the actual authorization, confirmation, and/or other actions. For example, the oversight system 102 and the oversight communication interface 118 may login and remotely access the device or system of the requesting user. Examples where such a remote access may be beneficial include a check approval or till approval in a banking scenario or a product return in a retailer scenario, such as where prior systems may require input of a managerial code or password to approve or authorize a transaction.

Regardless of the particular implementation, "software" includes computer-readable instructions, firmware, wired and/or programmed hardware, or any combination thereof on a tangible medium (transitory or non-transitory, as appropriate) operable when executed to perform at least the processes and operations described herein. In fact, each software component may be fully or partially written or described in any appropriate computer language including C, C++, JavaScript, Java™, Visual Basic, assembler, Perl®, any suitable version of 4GL, as well as others.

In general, the illustrated modules of the oversight application 112 may be combined into a single application or module in some instances. As noted, some of the oversight application 112 may be located or available at one or more oversight user systems or devices. Additionally, one oversight system 102 may be responsible for and associated with a plurality of local systems 150, wherein one oversight system 102 (or oversight user) can perform oversight for a plurality of local systems 150, such as multiple locations of a business or entity. By allowing the centralized oversight, on-site personnel may be reduced and a significant human resources benefit may be realized.

The local system 150, as illustrated, represents any relatively remote local system from the oversight system 102. In particular, the local system 150 may be a location of a business or entity, as well as a location at which a local user can work, such as a home or roaming office. For example, a local system 150 may be a single location of a multi-location business, where the local system 150 is associated with at least one user. On the other hand, the local system 150 may be a user's home office used for or associated with work with a larger business or enterprise. Additionally, the local system 150 may include a mobile system associated with one or more users, such as users operating a temporary location at an event. In some instances, the oversight user and/or oversight system 102 may be physically located at or near the local system 150. However, the oversight user and/or oversight system 102 are not local to the actions being overseen and reviewed.

The local system 150 includes client 160 associated with the user as well as one or more local connected devices 188. The client 160 may be any computing device operable to connect to or communicate with the oversight system 102, other clients 160, or other components via network 140, as well as with the network 140 itself, using a wireline or wireless connection. Each client 160 may be or include a desktop computer, a mobile device, a tablet, a server, or any other suitable computer device. In general, client 160 comprises an electronic computer device operable to receive, transmit, process, and store any appropriate data associated with the environment 100 of FIG. 1. In particular, client 160 executes one or more client application 168 for which oversight from a supervisor or second user may be needed.

As illustrated, client 160 includes an interface 162, a processor 164, a graphical user interface (GUI) 166, a client application 168, and memory 176. The interface 162, processor 164, and GUI 166 may be similar to or different than the interface 104, processor 106, and GUI 110 described for the oversight system 102. In general, processor 164 executes instructions and manipulates data to perform the operations of the client 160. Specifically, the processor 160 executes the algorithms and operations described in the illustrated figures, including the operations performing the functionality associated with the client application 168 and oversight module 170. Memory 176 may be similar to or different than memory 122. As described, memory 176 includes process rules 178 and oversight rules 180 as described below.

Client 160 executes a client application 168 operable to perform any suitable functionality, including but not limited to banking operations, point-of-sale operations, and others. Client application 160 may be a web application, desktop application, portal page or portal-based application or process, a dedicated mobile application, or other software. Client application 160 is used to perform at least one process-based operation, where a series of steps or operations are required, some of which may include a requirement for oversight from a second user. For some functionality, the client application 160 may reference and perform operations and actions related to a set of process rules 178. Similar to process rules 132, the process rules 178 may identify the actions to be taken in a process and the requirements for those actions. Further, the process rules 178 may be used to manage a particular operation or process performed by the client application 168.

Client 160 includes an oversight module 170. The oversight module 170 may be separate from, integral to, embedded within, or part of the client application 168 in different implementations. The oversight module 170 can provide the client 160 with the functionality necessary to identify a need for oversight, communicate that request to the oversight system 102, and communicate with the oversight user during the oversight process. The oversight trigger 172 may be an agent or module that monitors particular processes performed by the client application 168 to determine if and when oversight is needed. As illustrated, memory 176 of the client 160 includes a set of oversight rules 180. The oversight rules 180 manage the operation of the oversight module 170, including a set of trigger rules 182 and oversight entity rules 184. The trigger rules 182 may be a set of rules that determine when and how a request for oversight can be triggered by the oversight trigger module 172. For example, the trigger rules 182 may be linked to or associated with the process rules 178, where the process rules 178 may define when oversight is needed. In those instances, the trigger rules 182 can notify or alert the oversight trigger module 172 to initiate an oversight request. Alternatively, in instances where the process rules 178 are directed solely to the operations of the client-side user, the trigger rules 182 may identify various process-specific instances where oversight may be required. When the oversight trigger 172 identifies these instances, a request for oversight can be initiated.

When oversight is to be initiated, the oversight entity rules 184 provide information on where that request is to be sent. The information provided by those rules may identify a particular oversight system 102, either as the sole available system or out of an option of multiple systems. For example, certain types of oversight may be performed by independent oversight systems 102, such that a first oversight request is sent to a first oversight system 102 in relation to a first process, while a second oversight request associated with a second process may be sent to a second oversight system 102. In some instances, actions within a single process may require different oversight systems to be involved. In addition to identifying a particular oversight system 102, the oversight request and oversight entity rules 184 may identify a particular oversight user to perform the review. The particular oversight user may be statically defined in the rules, or the determination may be dynamically determined based on the requesting user, the current action, and the oversight users currently available or scheduled, as well as other suitable factors.

The oversight communication interface 174 can manage the sending of the request and the management of sharing and communicating information related to the current context of the process being executed at the client 160 and being overseen by the oversight user. The oversight communication interface 174 can perform the client-side functionality of the oversight communication as compared to the oversight system-side oversight communication interface 118. An additional operation performed by the oversight communication interface 174 is that of, in some instances, accessing information associated with one or more of the local connected devices 188 (e.g., via their respective communication interfaces 190). That information, providing one or more views or displays associated with the process being overseen, can be used by the oversight system 102 as described above. In some instances, the local connected devices 188 can provide their information directly to the oversight system 102 via communications between the oversight communication interface 118 and the communication interface 190 of the local connected device 188 itself.

The illustrated client 160 is intended to encompass any computing device such as a desktop computer, laptop/notebook computer, mobile device, smartphone, personal data assistant (PDA), tablet computing device, one or more processors within these devices, or any other suitable processing device. For example, the client 160 may comprise a computer that includes an input device, such as a keypad, touch screen, or other device that can accept user information, and an output device that conveys information associated with the operation of the client application 168 or the client 160 itself, including digital data, visual information, or a GUI 166, as shown with respect to the client 160.

The one or more local connected devices 188 of the local system 150 are any devices that can capture additional information related to the operations of the process being overseen. For example, the devices 188 may include cameras (image or video), such as security cameras, cameras associated with or integral to the client 160, cameras used by the requesting user, such as body cameras, and publically-available camera feeds, among others. Additionally, the devices 188 may include sensors (e.g., motion sensors), switches (e.g., light switches), and any other device related to the current action of the process and available to be shared and communicated to the oversight system 102. As described above, the devices 188 may provide the oversight user with a view from the perspective of the client 160 or the requesting user, allowing review of a particular process, action, or series of actions as if the oversight user was physically by or at the requesting user or client 160. In addition to providing the oversight user with a view, the local connected devices 188 may provide information back to the oversight user regarding their particular state or status. If a connected door is left open and/or unlocked during a branch closing process, for example, the status of that connected door can be suitably made available to the oversight user at the oversight system 102. In some instances, the oversight user may be able to remotely modify the status of one or more local connected devices 188, such as by remotely triggering a door or window to be locked, by arming a security system, or any suitable task available and enabled due to the connected nature of the particular devices 188.

In addition to information from the devices 188, some or all of the information present on the GUI 166 or other display device of the client 160 may be provided to the oversight system 102 on an on-going basis or for particular actions in a process.

As noted, the content captured by the devices 188, as well as their status information, can be sent to the oversight system 102, either directly via the communication interface 190 or via the oversight communication interface 174 of the client 160. In addition to the relevant content being shared to the oversight system 102, some or all of that content can be sent to and recorded at the oversight audit files 195. The oversight audit files 195 may be located at the oversight system 102, at the local system 150, or represented at a cloud-based or remote repository as illustrated in FIG. 1. In some instances, the oversight audit files 195 may be stored within memory 122 or memory 176.

While portions of the software elements illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

Figure 2:
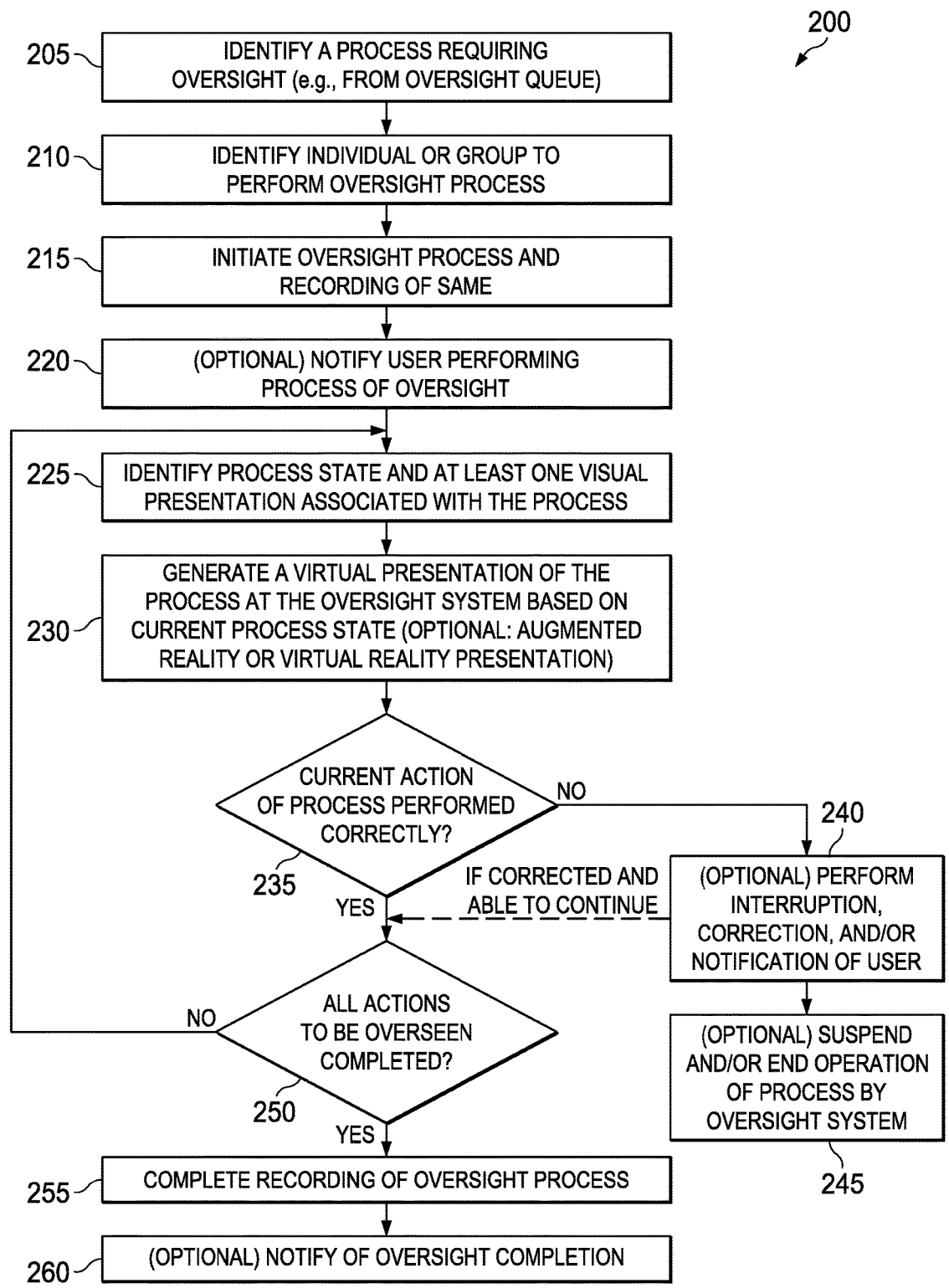
FIG. 2 is a flowchart of an example operation of an oversight system.

FIG. 2 is a flowchart of an example operation of an oversight system, such as oversight system 102. For clarity of presentation, the description that follows generally describes method 200 in the context of the system 100 illustrated in FIG. 1. However, it will be understood that method 200 may be performed, for example, by any other suitable system, environment, software, and hardware, or a combination of systems, environments, software, and hardware as appropriate.

At 205, a process requesting oversight is identified. In some instances, the process may be identified from an oversight queue or other mechanism for identifying requests for process oversight. In some instances, the requests may be manually generated by users requesting oversight, while in others the requests may be automatically be generated by an application being executed (e.g., a business application) or a monitoring program, module, or other software that determines when situations requiring oversight arise. Automatic requests may be based on business rules requiring approval (e.g., check processing) and/or oversight (e.g., branch opening operation), fraud-detection (e.g., based on an AML-triggered warning), and training purposes, among others. When a plurality of requests are received, any suitable prioritization scheme or rule set may be applied, where such requests are prioritized by time received, process involved, requesting user, requesting system, customer associated with request, or any other suitable parameter or combination of parameters.

At 210, a particular individual or group is identified as to be assigned the oversight process associated with the identified request and process. In some instances, a detailed rule set identifying who should be assigned oversight requests may be present and considered in determining to whom the request should be sent. For example, in some cases a request for authorization may be sent to a direct manager or other supervisor, while in other cases, an oversight request to authorize a particular size of a transaction may be sent to user or group that is not in the direct authority chain of the requesting user, such as an anti-fraud group at a bank. Alternatively, a request may be sent to a group of suitable supervisors, approvers, or other acceptable oversight users, where the first available person in the group can be assigned to the request. The assignment rules may include rules for any number of situations, as well as including rules for handling a plurality of similar requests in a near timeframe to avoid delays due to long queue times.

At 215, once the particular oversight user is identified, the oversight process can be initiated. During the oversight initiation, the interactions between the oversight user and the requesting user can be recorded for audit, compliance, and training purposes. In some instances, both the actions taken by the requesting user and the oversight user, as well as the visual imagery and information provided to the oversight user, can be stored for later review.

In addition to beginning the recording, the requesting user may be notified of the oversight user's addition at 220. This operation is optional, as some cases may exist where such notification is either unnecessary or unwanted. For example, in cases of potential fraud at a bank, oversight from an anti-fraud group at the financial institution may be requested without wanting to notify the requesting user (e.g., the teller). In those instances, no notification may be provided. In other instances, the notification may be represented as a pop-up visualization, a text-based notification within a GUI or within or overlaid upon the presentation of the AR/VR device, a sound-based statement or indication, or other suitable notification on the requesting user's system upon acceptance and/or initiated of the oversight process by or at the oversight system and the oversight user.

At 225, the current process state of the process being overseen can be identified, accessed, retrieved, or otherwise determined. Additionally, at least one visual presentation or other visual information, as well as auditory information, associated with the process being overseen are identified. In some instances, a status of one or more connected devices associated with the overseen process may be presented. The set of connected device statuses presented or made available may vary based on the current process or step. Using this combination of information, a virtual presentation of the process can be generated by the oversight system at 230 that reflects the current process state and the visual presentation or information available at the requesting user. In some instances, the current process state may include information identifying where in an operation-based process is currently executing (e.g., in a series of operations, which operation is current), as well as information previously and/or currently entered by the requesting user or the requesting user's system. The at least one visual presentation or visual information identified at 225 may include information displayed directly on the requesting user's system (e.g., client 160 and its GUI 166), information captured by one or more peripherals of the requesting user's device (e.g., a camera phone, a scanner, a video camera, etc.), or information captured by one or more connected devices (e.g., local connected devices 188) relatively local to the requesting user's systems (e.g., security cameras, sensors, switches, devices connected to the Internet of Things, among others). In many instances, auditory and/or textual presentations of the process and process states can be presented in addition or alternatively to the visual presentation. The application executing at the requesting user's system may know of the one or more visual presentations or information associated with the application and the current process state. In some instances, the application or another monitoring module or software can make the current state information and the visual information available to the oversight system in the oversight request. In others, the oversight request may provide links or other information from which the oversight system can derive or locate the relevant information, including audio feeds in addition to visual information. In some instances, the oversight request may allow the oversight system to connect directly to either or both of the requesting user's system and one or more connected devices that can provide the state and visual (or audio) information. As described above in FIG. 1, the visual presentation generated at 230 can be generated for one or both of a virtual or augmented reality presentation. In doing so, the oversight user to whom the information is presented can be provided with a real-time and realistic view of the requesting user's perspective, thereby allowing the oversight user to provide feedback, authorization, and approval as if they were physically located at or near the requesting user's system. Further, in addition to the specific views from the requesting user's perspective, additional information from the one or more connected devices may be provided, such as the current state or sensor reading of the connected devices.

At 235, a determination is made at the oversight system as to whether the current operation of the process being overseen is performed correctly. The determination can be made by the oversight user as the actions taken by the requesting user are monitored via the VR or AR presentation. In some instances, the required operations in the overseen process may be presented to the oversight user via the VR or AR presentation, such as an overlay or side menu to provide ease of review of the operations to be taken, as well as the requirements of the review and oversight. Additionally, information regarding the state of one or more connected devices may be used to perform the determination. For example, if the overseen process requires a certain sensor or switch to be triggered, information related to the current state of the sensor or switch may be provided to the oversight user. This information may be provided by visual, textual, or auditory means.

If the determination is made that the process is not completed correctly, or that approval/authorization is not to be provided, method 200 continues at 240, where the oversight system can optionally interrupt execution of the process, notify the requesting user of the issues, and/or correct the error performed by the user being overseen. In some instances, the interruption may be in the form of feedback provided by the oversight user. In such systems, control of the operation may move to the oversight user, where the oversight user can propose a change or modification to the action performed. This can be significantly of assistance as a training or coaching mechanism. In some instances, the process may be moved backwards, such that the first user can re-perform or restart the action identified. For example, the oversight user may be provided with the ability to communicate, using textual or verbal means with the requesting user during the oversight. In those instances, a notification to the requesting user can be provided, with the oversight user allowed or given access to perform an action to correct, reverse, or otherwise perform the correct operation or step determined to be incorrect. In some instances, such as where the requesting user is not notified of the oversight, the executing process may not be suspended or may be suspended without the requesting user's knowledge. The oversight user, via the oversight system, can prevent the result of the incorrect action from occurring or being propagated to a particular system. For example, where a check is determined to be fraudulent during the oversight process, the amount of money to be transacted may be placed on hold to avoid fraudulent deposits, withdrawals, or other action. In combination, security at the location of the requesting user may be notified and/or law enforcement. In those instances, the requesting user may not need to be aware of the oversight and may be safer, due to threat of bodily harm, if the oversight process was not made aware to him or her. If the current action can be corrected, method 200, may continue at 250, where a determination is made as to whether the operations to be overseen are completed. If the action cannot be corrected, method 200 continues to 245, where the operations of the process can be suspended and/or ended by the oversight system.

Returning to 235, if the determination is made that the operation is performed correctly, method 200 continues to 250. At 250, a determination is made as to whether all operations to be overseen for the process are completed. If all actions to be overseen have not been completed, method 200 returns to 225 to identify an updated process state and new, updated, or current visual presentations associated with the updated process state. This loop or flow can continue until all actions associated with oversight are completed. If, however, all actions to be overseen are completed, method 200 continues to 255, where the recording of the oversight process is completed. Once completed, the recording may be made available in an on-site or remote data store, accessible to authorized persons and entities, such as for audit purposes, compliance purposes, and/or training purposes, among others. Additionally, a notification of oversight completion may optionally be provided to the requesting user at 260. If the requesting user was never made aware of the oversight, no notification may be sent.

Figure 3:
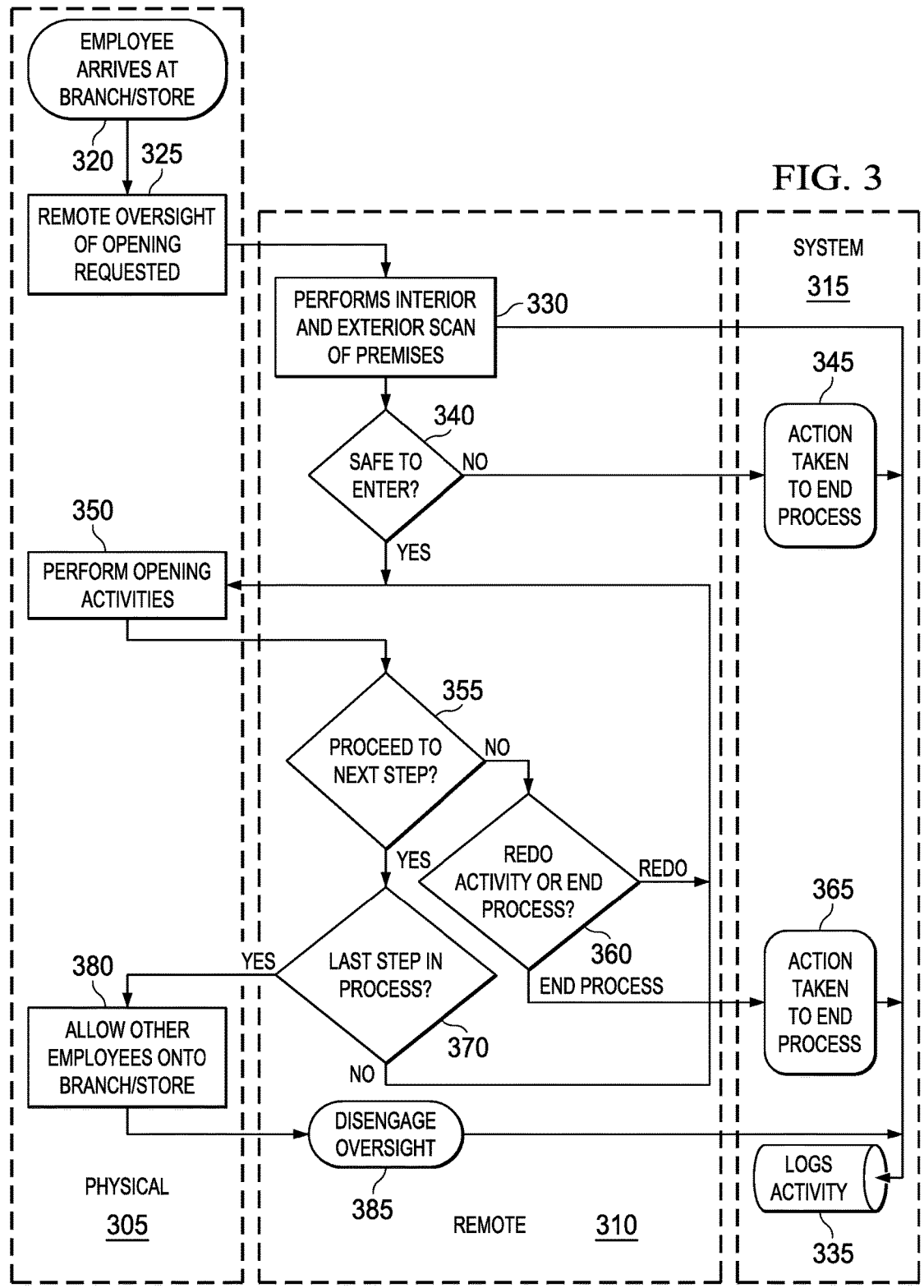
FIG. 3 is a swim lane diagram of example operations for a branch opening process using an oversight process.

FIG. 3 is a swim lane diagram of example operations for a branch opening process 300 employing the remote oversight operations from the perspective of a remote oversight user, the oversight system, and a user physically on-site at the branch location. For clarity of presentation, the description that follows generally describes method 300 in the context of the system 100 illustrated in FIG. 1. However, it will be understood that method 300 may be performed, for example, by any other suitable system, environment, software, and hardware, or a combination of systems, environments, software, and hardware as appropriate. Further, this illustration is meant to be a simple example of potential oversight scenarios, and is not meant to be limiting to persons of ordinary skill in the art.

In current situations, the branch opening process requires two on-site personnel, a first and second user. In particular, morning entry procedures are used to protect employees from encountering potentially harmful situations where unauthorized individuals may be present in the branch or may approach the employees as they enter the branch itself. In the current situation, two designated officers are required to conduct the morning entry procedures and must meet outside of the branch at a predetermined location within visibility of and reasonable distance from the branch. In some implementations, one senior branch official or officer may be present along with a relatively junior official or officer, although officers of similar rank or tenure may perform the opening in other implementations.

By using the remote oversight capabilities, the need for two officials to be physically present at the branch for opening is removed, thereby significantly freeing up resources to reduce the time and cost to have a second employee on site. With the remote oversight solution, a core use case is an employee (i.e., physical layer 305) performing activities manually at the branch while the remote oversight user monitors and supervises the manual actions. In some implementations, however, one or more activities may be performed by the remote oversight user (i.e., remote layer 310). In those instances, the remote oversight user may be able to directly perform one or more actions through connected devices, including through remote interactions with one or more connected devices, switches, or sensors. In one such example, the remote oversight user may be able to disarm security systems upon confirming the entry to the branch is safe, modify a connected thermostat to update the temperature settings in the building, or any other suitable activity. It will be noted that, for convenience of explanation, the illustrated activities are a significantly reduced set of operations to be performed in a branch opening scenario, and are meant to provide an illustration of how the oversight can be used without limiting the oversight or branch opening processes. Various actions and activities associated with the branch opening process involve multiple steps and actions, such as disarming alarms, turning on lights, unlocking doors, accessing internal systems, and others. The information from some or all of these activities performed at the branch can be relayed through various systems and connected devices (e.g., cameras, sensors, switches, etc.) and presented to the oversight user. For activities performed incorrectly, incompletely, or out-of-order, the remote oversight user can interrupt, correct, and/or modify the action, where appropriate, such that the remote oversight user can indicate to the local user that a step or operation needs to be redone, or in some cases, such that the remote oversight user can act through the oversight system to modify the operations or actions directly via one or more connected devices or remotely-accessed systems at the branch location.

Turning to method 300, three layers of operations are illustrated: a physical layer 305, a remote layer 310, and a system layer 315. The physical layer 305 is meant to reflect operations performed by an employee or officer physically present at the branch, while the remote layer 310 is meant to reflect operations performed by a remote oversight user remote from the branch. The system layer 315 is meant to reflect operations performed by the oversight system, including ending the oversight process and logging the various activities performed by the physically present and remotely located officers/employees.

At 320 an employee arrives at the local, physical branch for opening said branch. At 325, prior to performing any particular operations (or alternatively, before performing operations requiring oversight), the local employee can request remote oversight of the opening process. In some instances, the oversight system may be linked into the operations of the local branch such that opening the branch without a remote oversight process being operational may not be possible (e.g., locks or systems may not respond as usual), or may require alternative operations (e.g., an additional code or action required to unlock or allow in-person supervision and oversight).

In response to the request for oversight, the oversight system can provide inputs from the local branch to the oversight user at the remote layer 310. At 330, for example, the oversight user may receive input from a plurality of local connected devices, allowing the remote oversight user to perform interior and exterior scans of the premises. In one example, the remote oversight user may be provided feeds from one or more security cameras to determine whether unauthorized personnel are in or near the branch. Additionally, information as to the state of one or more connected devices, such as doors, windows, and other devices may be provided to the remote oversight user. The information provided to the remote oversight user can be stored at the system level 315, where the information received is logged, as well as the activities performed by the remote and local employees. Returning to 330, with the information provided from the connected devices of the branch and any cameras or input devices of the local employee, the remote oversight user, along with the local user performing a local inspection, can determine whether the branch is safe to enter at 340. If so, method 300 continues at 350. If not, method 300 continues to 345. At 345, an action can be taken to end the branch opening process based on the condition making the branch unsafe to enter. In one instance, the opening process may be interrupted where a break-in has occurred and police or other bank officials are to be notified. In general, the suitable operations associated with an unsafe situation can be performed, where the process is ended by performing an exit or abort process triggered by either the remote oversight user or the local user. At the same time, the activities performed and the related input can be logged (at 335) in the system level for later review and consideration.

At 350, normal opening activities are performed. These may include any suitable processing steps, including but not limited to, checking local systems (e.g., an ATM) for any signs of tampering or injury, disarming alarms, unlocking or locking outer and inner doors, and other particular activities. In many instances, the process being overseen will be defined by a step-by-step or task-based list or itinerary, such that the local user and remote oversight user can follow a prescribed set of operations to perform the opening. However, in some instances, the tasks performed may not be in a set or required order, thereby allowing the local user to perform, or allowing the remote oversight user to direct the local employee to perform, the tasks in a non-predetermined order. Some or all of the actions may require a check or approval by the remote oversight user as the process is performed. After each individual activity requiring oversight, method 300 can continue to 355, where a determination is made whether to proceed to the next step. If an issue with the performance of a particular operation is raised by the remote oversight user, method 300 may move to 360, where a determination is made whether to require the local employee to redo or re-perform the particular activity or where the action taken requires the process to be ended. If the operation or activity is to be re-performed, method 300 returns to 350. If the process is to be ended, method 300 continues to 365 where the required actions are performed to end the process.

If the determination is made to move to the next step (after a first or subsequent attempt at the operation), method 300 continues at 370 where a determination is made as to whether the last completed operation is the last step in the overall branch opening process. If not, method 300 returns to 350 and performs the next step in the branch opening process. If it was the last step, however, method 300 continues to 380, where upon successfully performing the opening process, the local employee can allow other employees into the branch, thereby signifying completion of the process. In response to the completion, the remote oversight user or the remote layer 310 can disengage oversight at 385, such that the logged activity and data is completed, closed, and saved for later use at 335.

Throughout the branch opening process, information and communication between the local employee and the remote oversight employee may be free-flowing, with the remote oversight employee playing a passive and/or active role in the branch opening procedure. Depending on the type and settings of the local connected devices, the remote oversight user may be able to perform significant opening activities from the remote layer, while in other instances, the remote oversight user may be limited to monitoring and remotely approving the actions taken by the local employee. The remote oversight user may check operations off at the remote layer 310, ensuring that the required operations are performed and providing assistance to complete the process, where needed or requested.

Figure 4A:
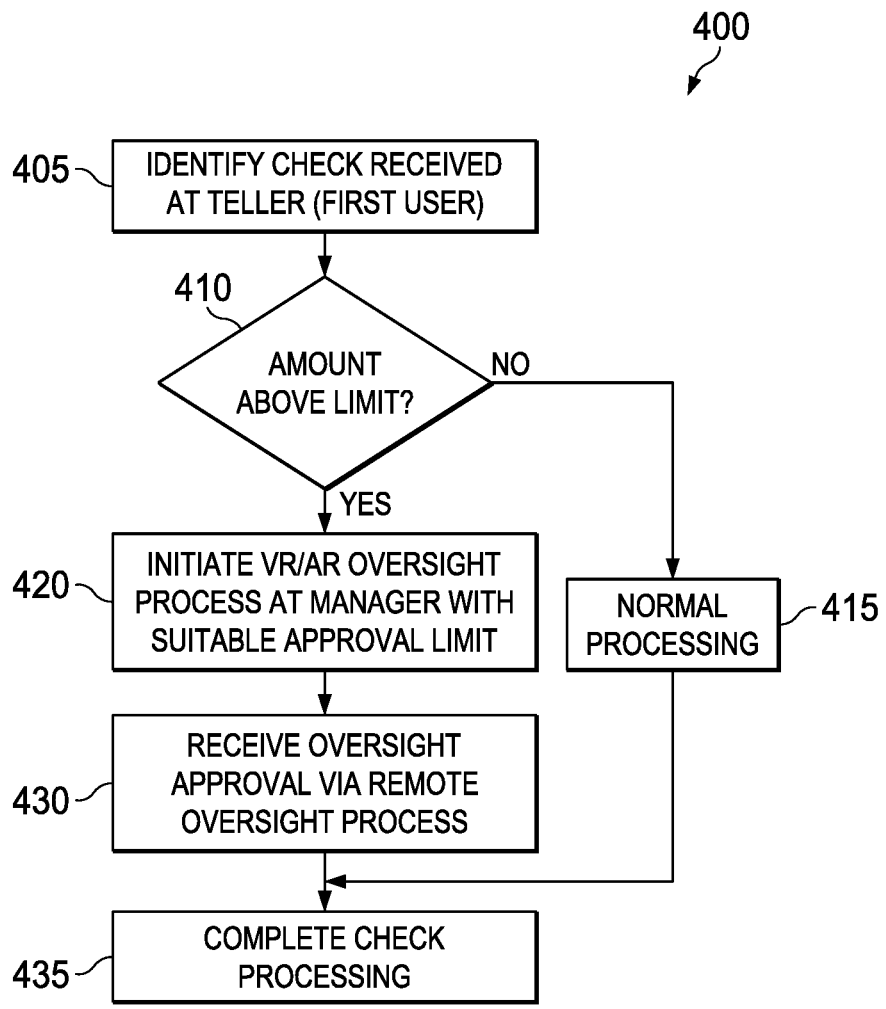
FIGS. 4A and 4B are flowcharts of example operations for a check approval process from the perspective of a first user and a remote second user performing an oversight process.
Figure 4B:
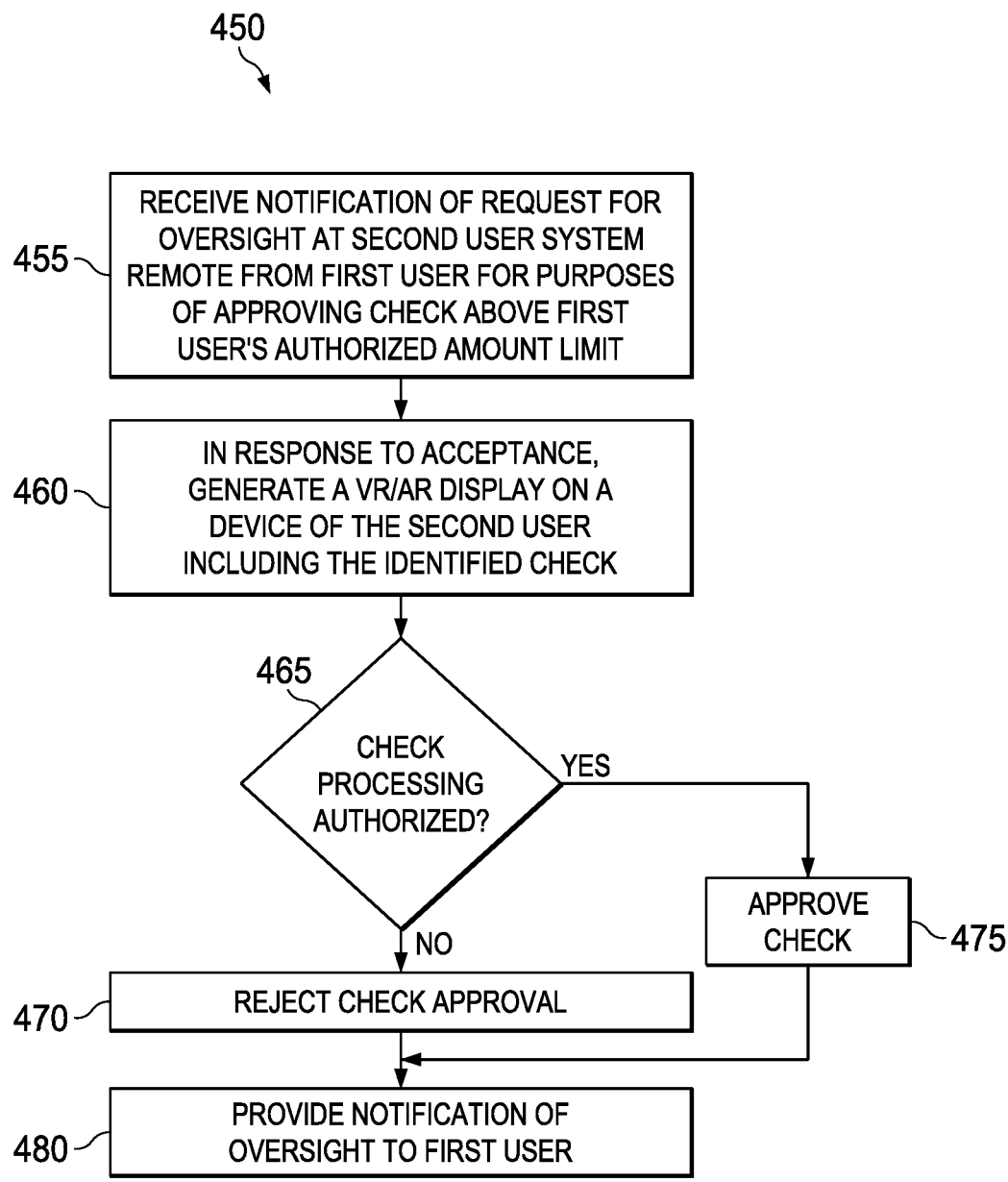

FIGS. 4A and 4B are flowcharts of example operations for a check approval process from the perspective of a first user and a remote second user performing an oversight process, respectively. For clarity of presentation, the description that follows generally describes methods 400 and 450 in the context of the system 100 illustrated in FIG. 1. However, it will be understood that methods 400 and 450 may be performed, for example, by any other suitable system, environment, software, and hardware, or a combination of systems, environments, software, and hardware as appropriate. Further, this illustration is meant to be a simple example of potential oversight scenarios, and is not meant to be limiting to persons of ordinary skill in the art.

As noted, FIG. 4A illustrates a check approval process from a teller at a bank's perspective, where the teller is the first or requesting user in the example. At 405, a check received at the teller and from a customer is identified for processing, for example, at a branch location of the associated financial institution. The process for processing the check is a defined process-based operation with one or more steps in the performance of processing. In the illustrated instance, a determination is made at 410 as to whether the amount of the transaction is above a teller limit or threshold. When the transaction amount is less than the limit, method 400 moves to 415 where the teller can process the check normally without oversight needed, completing the check processing at 435. If, instead, the transaction amount is higher than the identified limit, method 400 moves to 420 where an oversight process is initiated. In this example, the oversight process is managed through an AR or VR presentation at the oversight user as described above. For example, an image of the received check available from a scanner or camera at the teller, as well as information related to and describing the payee (e.g., identification, account information, etc.) may be combined to provide an augmented and/or virtual presentation to the oversight user. Additionally, portions of screens, GUIs, instructions, and/or displays presented to or at the teller may be made available within the augmented and/or virtual display. At 430, oversight approval may be received via the remote oversight process, such that the check processing may be completed at 435. In some instances and as identified above, the teller may not receive a notification that an oversight process has been initiated. In those instances, the system may either allow the process to continue as oversight occurs in parallel, or it may cause a delay in moving forward until approval or authorization is received. When the oversight user interrupts the process due to an issue, error, or for another reason, the teller may be notified of a delay or may be notified of a change requested by the oversight process.

FIG. 4B illustrates the check approval process from the perspective of the oversight user. At 455, a notification of a request for oversight is received at the oversight user's (i.e., the second user's) system, where the oversight user is relatively remote from the teller for purposes of approving the received check when the transaction amount is above the teller's authorized amount limit. In response to accepting the request, a VR/AR display is generated for and presented at the corresponding VR/AR device of the oversight user at 460. The generated display can include, as noted above, an image of the received check (via a scanner or camera at the teller), information from the teller's system, as well as information from one or more connected devices at or near the teller's system, such as security cameras, nearby sensors, and other available devices. For example, an image or video of the payee may be made available to the oversight user, thereby allowing them to see the payee, the check, and/or any identification information that may be needed to approve, authorize, or reject the check.

At 465, a determination is made by the oversight user as to whether the check processing is authorized and meets all required criteria. If so, the oversight user can approve the transaction at 475. If not, method 450 continues at 470 where the check approval is rejected, or the process is otherwise suspended. During this time, the oversight user may provide feedback to the teller, modify entries or actions taken during the check processing process, or end the check processing process, among others options. At 480, notification of the action taken by the oversight user and the completion of the oversight is provided to the teller. In some cases, no notifications to the teller may be provided as noted above.

The preceding figures and accompanying description illustrate example systems, processes, and computer-implementable techniques. While the illustrated systems and processes contemplate using, implementing, or executing any suitable technique for performing these and other tasks, it will be understood that these systems and processes are for illustration purposes only and that the described or similar techniques may be performed at any appropriate time, including concurrently, individually, or in combination, or performed by alternative components or systems. In addition, many of the operations in these processes may take place simultaneously, concurrently, and/or in different orders than as shown. Moreover, the illustrated systems may use processes with additional operations, fewer operations, and/or different operations, so long as the methods remain appropriate.

Various potential alternatives and additional features may be considered with the illustrations and descriptions herein. For example, in some instances, multiple levels of review and oversight may be needed, such that a first oversight user may need authorization from a second oversight user. Similar operations and assignments may occur such that the actions of the first oversight user are monitored and approved by the second oversight user.

Additionally, some processes to be overseen may include more regimented actions to be performed than others. One example may be a branch opening or closing, where each action must occur in a particular order and in a particular manner to be acceptable and approved. In such an example, two bank officers may be required to conduct the morning entry procedures. Normally and without this solution, the two officers must meet outside the branch at a predetermined location within visibility and reasonable distance from the branch, with a series of specific steps to be completed by the first and second designated officers. The present solution can allow one of those two users to be remotely located, where the remote officer has access to a camera associated with (and/or in control of or on the person of) the local officer, as well as potential feeds available from one or more cameras, sensors, etc. available at the branch (e.g., security feeds, alarm information, thermostat information, motion detectors, lock information, and others). At each step of the process, the two can verify the correctness and completeness of the defined tasks. Because the remote officer can rely on the data he or she receives, the process can be completed without two on-site officers.

In some instances, the oversight users may be able to trigger a secondary local review or action, such as where a local branch manager or local supervisor may be notified that an in-person action or authorization is required. The oversight user or the oversight system can contact the additional user via the oversight system or another suitable method.

In an additional alternative, notification rules may depend on the persons and entities associated with the oversight process, as well as the reason for the oversight. In cases triggered due to an AML-related issue, the requesting user may not be notified of the oversight process. Where the oversight is triggered due to suspected employee (i.e., requesting user) fraud, the manager of the suspected employee may be notified of the oversight process but not the employee. Where the oversight is triggered due to a compliance or transaction limit reason, all relevant employees or users at the local system may be notified (e.g., the requesting user and his or her local manager). When the oversight is triggered for a specific process such as standard branch or location opening or closing, all relevant employees associated with the process may be notified. In some instances, the notification rules may be separate from the other rule sets described herein, or they may be included or integrated into those rules.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system comprising:
a memory;
at least one hardware processor interoperably coupled with the memory and configured to:
identify, at a first system executing a process-based operation performed at a physical first location in association with a customer, a current action of the process-based operation performed by a first user at the first location for the customer, the current action of the process-based operation triggering an automatic request for oversight to be performed by a second system at a remote second location;
in response to the identifying, identify a current state associated with a current step of the process-based operation at the first location;
determine at least one image or video input source capturing at least a portion of the process-based operation in the current state occurring at the first location;
generate, for presentation at a display at the second location, a simulation of the current state of the process-based operation at the first location, the simulation incorporating input from the at least one determined image or video input source and simulating the current state of the process-based operation performing the current action of the process-based operation from a perspective of the first user;
identify an action performed at the first location in the current state of the process-based operation, wherein the action performed at the first location seeks authorization from the second location; and
transmit a request to the second location to authorize the identified action.

2. The system of claim 1, wherein the physical first location is associated with a first user, and wherein the remote second location is associated with a second user.

3. The system of claim 2, the at least one hardware processor configured to:
receive authorization from the second user at the second location; and
in response to receiving authorization from the second user at the second location, notify the first user at the first location of the authorization and allowing the process-based operation to continue to a next state at the first location.

4. The system of claim 2, the at least one hardware processor configured to: in response to not receiving authorization from the second user at the second location, suspending execution of the process-based operation at the first location.

5. The system of claim 4, wherein suspending execution of the process-based operation at the first location includes providing control of the process-based operation to the second user at the second location, wherein the second user can perform or revise the identified action within the simulation of the current state, wherein feedback representing the performed or revised actions performed by the second user at the second location are transmitted to a display associated with the first user at the first location.

6. The system of claim 4, wherein suspending execution of the process-based operation at the first location includes:
providing control of the process-based operation to the second user at the second location;
receiving instructions from the second user related to at least one correction to the identified action; and
providing control of the process-based operation to the first user at the first location to revise the identified action based on the received instructions.

7. The system of claim 2, wherein identifying the process-based operation includes:
identifying, from a plurality of process-based operations performed at a plurality of physical locations by at least the first user and a third user, a queue of two or more requests for oversight of at least two process-based operations performed by at least one of a second user and a fourth user remote from at least the first user and the third user, wherein the identified process-based operation is associated with the remote second user for oversight.

8. The system of claim 2, wherein identifying the at least one input source associated with the current state of the process-based operation at the first location of the first user includes identifying one of a video or image feed capturing data at the location of the first user, a video or image feed associated with the first user, a video or image feed associated with the process-based actions of the first user at the first location, or a visualization of a display associated with the first user at the first location.

9. The system of claim 2, wherein identifying the at least one input source associated with the current state of the process-based operation at the first location of the first user includes a state indication associated with at least one connected device present at the first location or a state indication associated with at least one connected device involved in the process-based operation.

10. The system of claim 2, wherein the first user is not notified of the automatic request for oversight from the remote second user.

11. The system of claim 2, the at least one hardware processor configured to: display, to the second user at the second location, the generated simulation of the current state of the process-based operation.

12. The system of claim 11, wherein the generated simulation of the current state of the process-based operation is displayed at the second location to the second user via an augmented reality display, wherein the augmented reality display comprises an overlay of at least a portion of input from the at least one input source on real-world content at the second location, and wherein the augmented reality display allows for input from the second user to authorize actions in the process-based operation.

13. The system of claim 11, wherein the generated simulation of the current state of the process-based operation is displayed at the second location to the second user via virtual reality display, wherein the virtual reality display is presented within a virtual reality output device at the second location, and wherein the virtual reality display allows for input from the second user to authorize actions in the process-based operation.

14. A non-transitory, computer-readable medium storing computer-readable instructions executable by a computer and configured to:
identify, at a first system executing a process-based operation performed at a physical first location in association with a customer, a current action of the process-based operation performed by a first user at the first location for the customer, the current action of the process-based operation triggering an automatic request for oversight to be performed by a second system at a remote second location;
in response to the identifying, identify a current state associated with a current step of the process-based operation at the first location;
determine at least one image or video input source capturing at least a portion of the process-based operation in the current state occurring at the first location;
generate, for presentation at a display at the remote second system, a simulation of the current state of the process-based operation at the first location, the simulation incorporating input from the at least one identified input source;
generate, for presentation at a display at the second location, a simulation of the current state of the process-based operation at the first location, the simulation incorporating input from the at least one determined image or video input source and simulating the current state of the process-based operation performing the current action of the process-based operation from a perspective of the first user;
identify an action performed at the first location in the current state of the process-based operation, wherein the action performed at the first location requires authorization at the remote second location; and
transmit a request to the remote second location to authorize the identified action.

15. The medium of claim 14, wherein the physical first location is associated with a first user, and wherein the remote second location is associated with a second user.

16. The medium of claim 15, the instructions executable by a computer and configured to, in response to not receiving authorization from the second user at the second location, suspending execution of the process-based operation at the first location, wherein suspending execution of the process-based operation at the first location includes providing control of the process-based operation to the second user at the second location, wherein the second user can perform or revise the identified action.

17. The medium of claim 15, wherein identifying the at least one input source associated with the current state of the process-based operation at the first location of the first user includes at least one of:
identifying one of a video or image feed capturing data at the first location of the first user, a video or image feed associated with the first user, a video or image feed associated with the process-based actions of the first user, or a visualization of a display associated with the first user at the first location; or
identifying the at least one input source associated with the current state of the process-based operation at the first location includes a state indication associated with at least one connected device present at the first location or a state indication associated with at least one connected device involved in the process-based operation.

18. The medium of claim 15, the instructions executable by a computer and configured to display, to the second user at the second location, the generated simulation of the current state of the process-based operation, wherein the generated simulation of the current state of the process-based operation is displayed to the second user at the second location via an augmented reality display, wherein the augmented reality display comprises an overlay of at least a portion of input from the at least one input source on real-world content at the second location to the second user.

19. The medium of claim 15, the instructions executable by a computer and configured to display, to the second user at the second location, the generated simulation of the current state of the process-based operation, wherein the generated simulation of the current state of the process-based operation is displayed to the second user at the second location via virtual reality display, wherein the virtual reality display is presented within a virtual reality output device at the second location to the second user.

20. A computerized method performed by one or more processors, the method comprising:
   identifying, by at least one processor and at a first system executing a process-based operation performed at a physical first location in association with a customer, a current action of the process-based operation performed by a first user at the first location for the customer, the current action of the process-based operation triggering an automatic request for oversight to be performed by a second system at a remote second location;
   in response to the identifying, identifying, by at least one processor, a current state associated with a current step of the process-based operation at the first location;
   determining, by at least one processor, at least one image or video input source capturing at least a portion of the process-based operation in the current state occurring at the first location;
   generating, by at least one processor and for presentation at a display at the second location, a simulation of the current state of the process-based operation at the first location, the simulation incorporating input from the at least one determined image or video input source and simulating the current state of the process-based operation performing the current action of the process-based operation from a perspective of the first user;
   identifying, by at least one processor, an action performed at the first location in the current state of the process-based operation, wherein the action performed at the first location requires authorization by the second location; and
   transmitting, by at least one processor, a request to the second location to authorize the identified action.

* * * * *

UNITED STATES PATENT AND TRADEMARK OFFICE
CERTIFICATE OF CORRECTION

PATENT NO. : 10,454,943 B2
APPLICATION NO. : 15/234786
DATED : October 22, 2019
INVENTOR(S) : Christianne Moretti et al.

Page 1 of 1

It is certified that error appears in the above-identified patent and that said Letters Patent is hereby corrected as shown below:

On the Title Page

Column 2, under FOREIGN PATENT DOCUMENTS, please replace "WO2013085653," with -- WO2013085853, --

In the Claims

In Claim 3, Line 5, please replace "allowing" with -- allow --

In Claim 20, Line 6, please replace "identifying, identifying," with -- identifying, --

Signed and Sealed this
Fourth Day of February, 2020

Andrei Iancu
*Director of the United States Patent and Trademark Office*